(12) United States Patent
Whorton

(10) Patent No.: US 7,017,866 B2
(45) Date of Patent: Mar. 28, 2006

(54) TUBE SUPPORT DEVICE

(76) Inventor: Jere D. Whorton, No. 408, 2101 Hayes Rd., Houston, TX (US) 77077

( * ) Notice: Subject to any disclaimer, the term of this patent is extended or adjusted under 35 U.S.C. 154(b) by 142 days.

(21) Appl. No.: 10/808,002

(22) Filed: Mar. 24, 2004

(65) Prior Publication Data

US 2005/0211853 A1    Sep. 29, 2005

(51) Int. Cl.
*F16B 15/00* (2006.01)
(52) U.S. Cl. ............................................. 248/71
(58) Field of Classification Search .............. 248/71, 248/65, 49, 56, 67.5, 73, 74.1, 74.2, 74.5
See application file for complete search history.

(56) References Cited

U.S. PATENT DOCUMENTS

| | | | | |
|---|---|---|---|---|
| 4,267,995 A | * | 5/1981 | McMillan | 248/74.1 |
| 4,769,985 A | * | 9/1988 | Moritz | 59/78.1 |
| 4,775,121 A | * | 10/1988 | Carty | 248/68.1 |
| 4,783,029 A | * | 11/1988 | Geppert et al. | 248/74.1 |
| 4,844,657 A | * | 7/1989 | Ripley et al. | 405/154.1 |
| 4,958,792 A | * | 9/1990 | Rinderer | 248/74.2 |
| 5,267,710 A | * | 12/1993 | Condon | 248/65 |
| 5,533,696 A | * | 7/1996 | Laughlin et al. | 248/74.2 |
| 5,613,655 A | * | 3/1997 | Marion | 248/68.1 |
| 5,971,329 A | * | 10/1999 | Hickey | 248/68.1 |

\* cited by examiner

*Primary Examiner*—Robert P. Olszewski
*Assistant Examiner*—Todd M. Epps
(74) *Attorney, Agent, or Firm*—John R. Casperson

(57) ABSTRACT

A tube support device particularly well suited for neon tubing comprises a channel shaped portion and a cap portion. The channel shaped portion has at least one bottom leaf spring portion extending angularly toward the longitudinal axis of the tunnel for biasing a tube against movement toward the bottom wall, at least one first side leaf spring portion extending angularly toward the longitudinal axis of the tunnel for biasing a tube against lateral movement toward the first sidewall, and at least one second side leaf spring portion extending angularly toward the longitudinal axis of the tunnel for biasing a tube against lateral movement toward second sidewall. The cap portion, when in the latched position, has at least one upper leaf spring portion extending angularly toward the longitudinal axis of the tunnel for biasing a tube away from the cap portion. The device is preferably unitary thermoplastic construction for low cost and to provide cushioned and electrically insulated support for the tube.

13 Claims, 2 Drawing Sheets

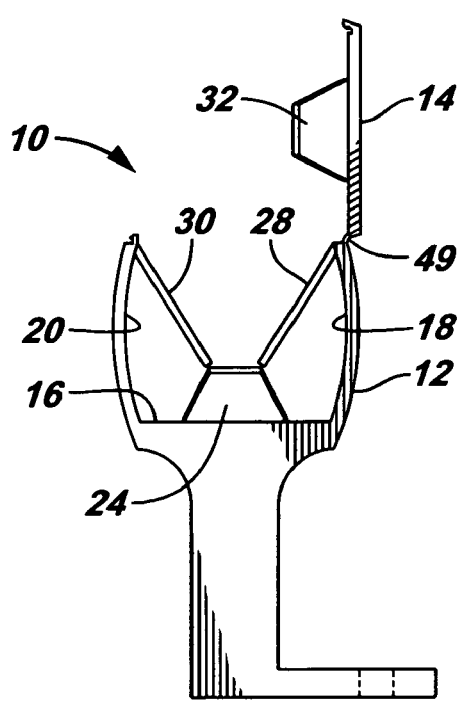
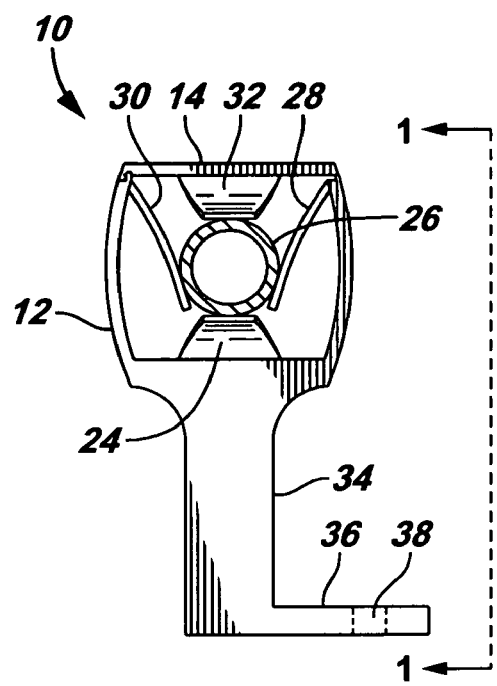
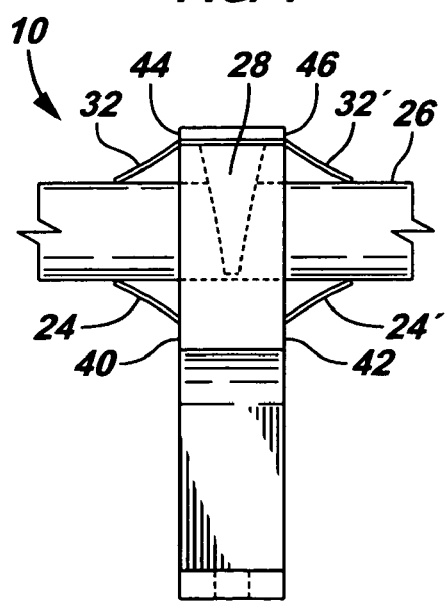
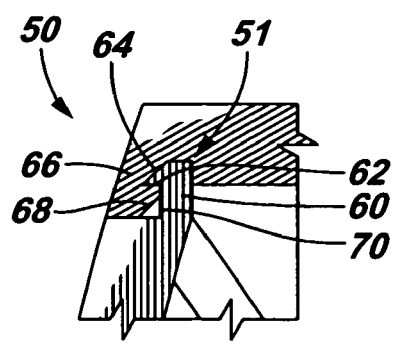

TUBE SUPPORT DEVICE

FIELD OF THE INVENTION

In one aspect, this invention relates to a tube support. In a further aspect, this invention relates to a tube support for a fragile tube, such a tube for a neon sign, or other type of tube which requires an elevated position from the mounting surface.

BACKGROUND OF THE INVENTION

Neon tubing is commercially available in a range of sizes, generally ranging from 8 mm to 15 mm in diameter. When deployed, it is important that the tubing be securely held, to reduce the likelihood of wind damage and the like. At present, this is done with specific tube supports designed to accommodate a specifically sized tube. A single tube support which could accommodate multiple tubing diameters would be very desirable as it would cost less to produce and less to keep in inventory.

Commercially available tube supports are provided in multiple pieces. The pieces must be separately manufactured. A supply of the proper pieces must be kept in inventory, and assembled prior to use. On site, separate pieces can be dropped or lost. A tube support which is molded as a one-piece unit would provide lower production costs and lower deployment costs, and would therefore be very desirable.

Neon tubing is presently constructed of thin-walled glass. The tubing is easily destroyed during handling and under conditions of use. A tube support device which provides a cushioned support of the tubing would provide longer life for the tubing, and would be very desirable.

A tube support which provides a positive latching mechanism without the use of hand tools would be very desirable because it could be more easily installed than existing tube supports. The risk of damaging the tubing or dropping the hand tool to an inconvenient location would also be reduced.

OBJECTS OF THE INVENTION

It is an object of this invention to provide a tube support device which fulfills the above noted needs.

It is a further object of this invention to provide such a tube support device which has an acceptable appearance.

It is another object of this invention to provide a method for supporting a neon tube which takes advantage of the attributes of the tube support device of the invention.

SUMMARY OF THE INVENTION

In one embodiment of the invention, there is provided a tube support device comprising a channel shaped portion and a cap portion. The channel shaped portion has a bottom wall, a first sidewall, and a second sidewall, each sidewall having an upper end and a lower end. The sidewalls extend upwardly from opposite sides of the bottom wall to define a channel. The cap portion latches across the upper ends of the first sidewall and the second sidewall to form, in combination with the channel shaped portion, a tunnel for receiving a tube. The tunnel has a longitudinal axis. The channel shaped portion has at least one bottom leaf spring portion extending angularly toward the longitudinal axis of the tunnel for biasing a tube against movement toward the bottom wall, at least one first side leaf spring portion extending angularly toward the longitudinal axis of the tunnel for biasing a tube against lateral movement toward the first sidewall, and at least one second side leaf spring portion extending angularly toward the longitudinal axis of the tunnel for biasing a tube against lateral movement toward the second sidewall. The cap portion, when in the latched position, has at least one upper leaf spring portion extending angularly toward the longitudinal axis of the tunnel for biasing a tube away from the cap portion.

By positioning a tube in the channel shaped portion, and moving the cap portion from an unlatched position to a latched position, the tube will be restrained from movement toward the bottom wall of the channel shaped portion by the at least one bottom leaf spring portion, will be restrained against movement toward the first sidewall by the at least one first side leaf spring portion, will be restrained against movement toward the second side wall by the at least one second side leaf spring portion, and will be restrained against movement toward the cap portion by the at least one upper leaf spring portion.

The leaf springs permit the device to accommodate a wide range of tube diameters. The device can also be formed from injection molded thermoplastic, at least for a neon tubing application, which makes it very inexpensive. Utilizing plastic construction for the leaf springs also further protects the tubes. Furthermore, the plastic construction permits the cap and the channel to be attached to each other by an inexpensive "living" hinge, eliminating the need for a separate mold and further eliminating assembly costs.

BRIEF DESCRIPTION OF THE DRAWINGS

FIG. 2 is an end view of the invention shown in FIG. 1, sans tube, in another configuration.

FIG. 3 is an end view of the invention shown in FIG. 1.

FIG. 4 is a side view of the invention shown in FIG. 3, along lines 1—1.

FIG. 5 is a detailed view of a portion of the invention shown in FIG. 3.

DETAILED DESCRIPTION OF THE INVENTION

Description with Reference to the Drawings

Figure 1:
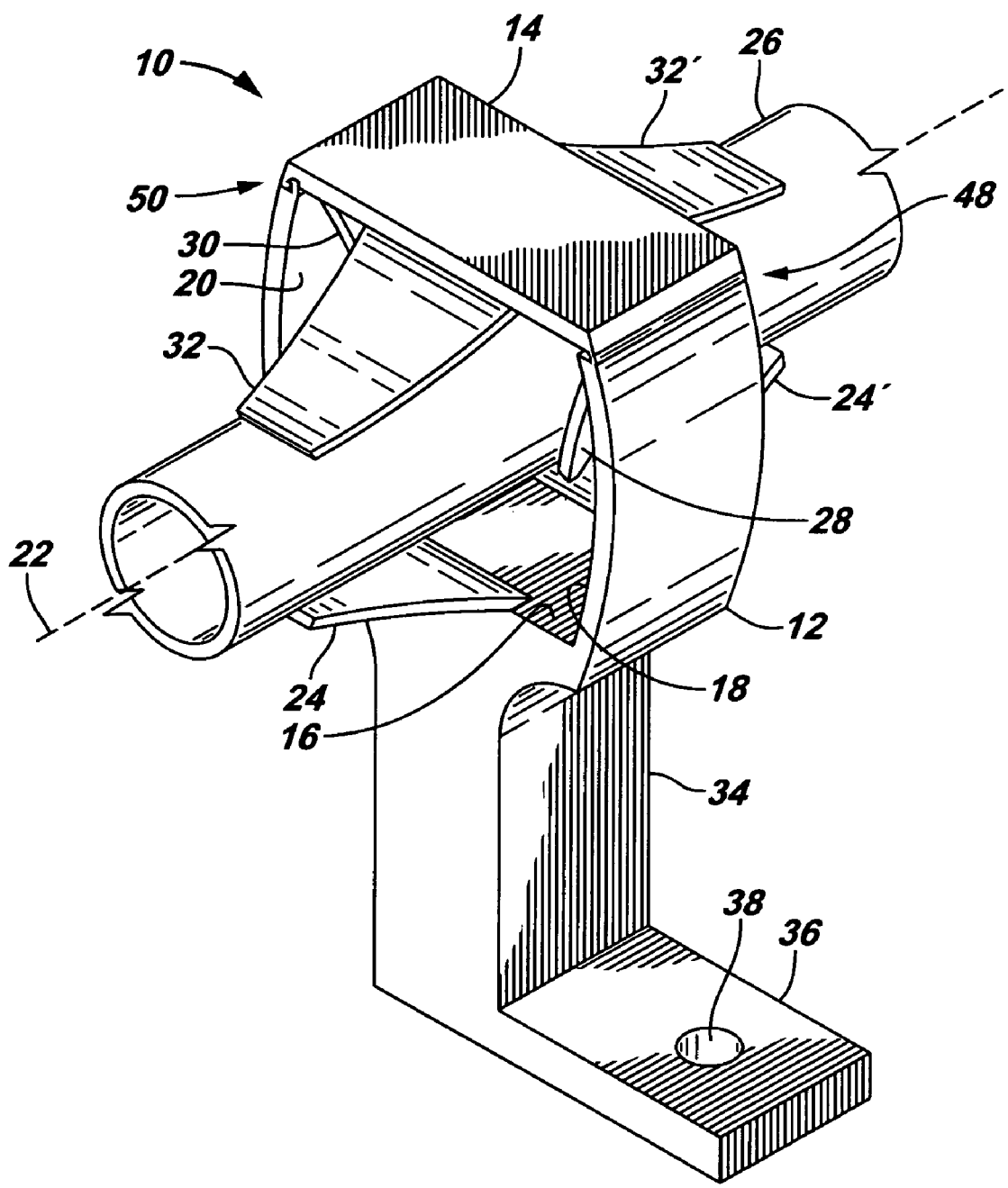
FIG. 1 is a pictorial representation of one embodiment of the invention as used to position a tube.

In one embodiment of the invention, there is provided a tube support device 10 comprising a channel shaped portion 12 and a cap portion 14. The illustrated embodiment is a top-opening device, and the structural relationships between the elements is described herein for convenience using "upper" and "lower" as the frame of reference. However, it is to be understood that the invention could be implemented with a side opening device, for example, or installed on a vertical base structure, and the frame-of-reference terminology used herein for convenience should not to be construed as unnecessarily limiting of the ways in which the invention could be carried out.

The channel shaped portion has a bottom wall 16, a first sidewall 18, and a second sidewall 20, each sidewall having an upper end and a lower end. The sidewalls extend upwardly from opposite sides of the bottom wall to define a channel. The cap portion 14 latches across the upper ends of the first sidewall and the second sidewall to form, in combination with the channel shaped portion, a tunnel for receiving a tube. The tunnel has a longitudinal axis 22.

The channel shaped portion has at least one bottom leaf spring portion 24, 24' extending angularly toward the longitudinal axis of the tunnel for biasing a tube 26 against movement toward the bottom wall, at least one first side leaf spring portion 28 extending angularly toward the longitudinal axis of the tunnel for biasing a tube against lateral movement toward the first sidewall, and at least one second side leaf spring portion 30 extending angularly toward the longitudinal axis of the tunnel for biasing a tube against lateral movement toward second sidewall. The cap portion, when in the latched position, has at least one upper leaf spring portion 32,32' extending angularly toward the longitudinal axis of the tunnel for biasing a tube away from the cap portion.

In a preferred embodiment of the invention, the tube support device further comprises a support leg portion 34 extending away from a lowermost wall of the channel shaped portion for spacing the channel shaped portion away from a base structure (not shown). In the illustrated embodiment, the support leg portion extends away from the bottom wall. The support leg portion has a lower end and a foot portion 36 extending laterally away from the lower end. The foot portion has an aperture 38 therethrough for receiving a fastener for affixing the tube support device to the base structure. Preferably, the foot portion extends laterally from the lower end of the support leg portion in a direction transverse to the longitudinal axis of the tunnel to facilitate affixing the tube support device to the base structure when a tube is supported by the tube support device.

In the illustrated embodiment, (see FIG. 4) the channel portion of the tube support device has a first end 40 and a second end 42 and the pair of bottom leaf spring portions 24, 24' extend in opposite directions from the first end and the second end toward the longitudinal axis of the tunnel. The pair of bottom leaf spring portions preferably extends from the bottom wall of the channel shaped portion. Also, the cap portion, when in the latched position, is shown as having a first end 44 and a second end 46, and the pair of upper leaf spring portions extends in opposite directions from the first end and the second end of the cap portion angularly toward the longitudinal axis of the tunnel. Further, the at least one first side leaf spring portion extends from an upper portion of the first sidewall toward the bottom wall and the at least one second side leaf spring portion extends from an upper portion of the second sidewall toward the bottom wall.

In a particularly preferred embodiment of the invention, the cap portion is connected to the upper end of the first sidewall by a hinge means 48, and, when in a closed position, is connected to the upper end of the second sidewall by a latch means 50. Various hinge means, such as posts and depressions or pins and bores, can be used, but a living hinge 49 (see FIG. 2) is preferred, as this provides a unitary structure and permits the device to be made in a single mold, such as from thermoplastic. Polyolefin thermoplastic is preferred, for example, a UV stabilized, flame retardant polypropylene. A number of latch means can also be employed, but a snap type latch 51 (see FIG. 5) which is urged to the latched position by the action of the second leaf spring portion against the tube is preferred. In the illustrated embodiment, an upwardly extending wall 60 projects from the upper end of the second sidewall and has an outwardly extending ridge 62 which engages an inwardly facing groove 64 on the cap portion. A downwardly extending wall 66 projects from the end of the cap portion and has an inwardly extending ridge 68 which engages an outwardly facing groove 70 on the upwardly extending wall.

The leaf spring portions are preferably generally triangularly shaped and attached to the channel shaped portion and the cap portion along a base edge of the triangle. The amount of bias exerted by the leaf spring portions can vary and may depend on the diameter of the tube, but generally a bias force in the range of 1 to 10 kg will be exerted when thermoplastic construction is used.

The tube support device is used by positioning a tube in the channel shaped portion and moving the cap portion from an unlatched position to a latched position. Over a wide range of tube sizes, the tube is thereby restrained from movement toward the bottom wall of the channel shaped portion by the at least one bottom leaf spring portion, and is restrained against movement toward the first sidewall by the at least one first side leaf spring portion, and is restrained against movement toward the second side wall by the at least one second side leaf spring portion, and is restrained against movement toward the cap portion by the at least one upper leaf spring portion. The tube support device may be affixed to a base structure before or after the tube is so positioned.

When the support device is used to support a tube of a diameter within its design parameters, the leaf spring portions are partially compressed by the action of the tube as the cap portion is moved from the unlatched position to the latched position, to reliably support the tube in the device in a cushioned manner.

FURTHER DESCRIPTION OF A PREFERRED EMBODIMENT

The tube support of the preferred embodiment of the invention is composed of one plastic part which is designed to accomplish the following functions:

1. Provide a supportive mounting position for glass neon tubing or other material that requires an elevated position from the mounting surface, such as a sign face or background.

2. As tubing is introduced into the receiver of the tube support, contact is made between two opposing spring like projections that are formed so as to provide positive pressure against both side of the tubing. Simultaneously the tubing comes in contact with two springlike projections which exerts pressure from the bottom of the receiver.

3. To maintain this relative position between the tubing and the receiver, a hinged cap at the top of the receiver which has matching but opposing projections, when closed and locked, exerts equal pressure upon the top surface of the tubing.

4. The cushioning of the six points of contact by the spring like projections thus support the tubing within the receiver, provide both secure locking of the tubing within the receiver, and provides adjustments both laterally and longitudinally to compensate for any movement of the mounting surface that would cause breakage or otherwise compromise the tubing.

5. The vertical support of the receiver provides a 90° projection at its lower end for the purpose of mounting by utilizing the hole provided in its surface by either rivet, screw or adhesive.

6. Since the normal position of the six contact points accommodate the smallest diameter tubing, the insertion of progressively larger diameter tubing is likewise captured in the closed position and provided the same cushioned protection as noted above, providing the unit universal use of different diameters. As the tube size increases, the pressure on the tube sidewall also increases, but because larger diameter tube has higher wall strength, the additional pressure is easily accommodated.

While certain preferred embodiments of the invention have been described hereinabove, the invention is not to be construed as being so limited, except to the extent that such limitations are found in the claims.

What is claimed is:

1. A tube support device comprising a channel shaped portion and a cap portion, the channel shaped portion having a bottom wall, a first sidewall and a second sidewall, each sidewall having an upper end and a lower end and extending upwardly from opposite sides of the bottom wall to define a channel, the cap portion latching across the upper ends of the first sidewall and the second sidewall to form, in combination with the channel shaped portion, a tunnel for receiving a tube, said tunnel having a longitudinal axis, the channel shaped portion having at least one bottom leaf spring portion extending angularly toward the longitudinal axis of the tunnel for biasing a tube against movement toward the bottom wall of the channel shaped portion, at least one first side leaf spring portion extending angularly toward the longitudinal axis of the tunnel for biasing a tube against lateral movement toward the first sidewall, and at least one second side leaf spring portion extending angularly toward the longitudinal axis of the tunnel for biasing a tube against lateral movement toward second sidewall, and wherein the cap portion, when in the latched position, has at least one upper leaf spring portion extending angularly toward the longitudinal axis of the tunnel for biasing a tube away from the cap portion.

2. A tube support device as in claim 1 further comprising a support leg portion extending away from a lowermost wall of the channel shaped portion for spacing the channel shaped portion away from a base structure.

3. A tube support device as in claim 2 wherein the support leg portion extends from the bottom wall and has a lower end and a foot portion extending laterally away from the lower end, said foot portion having an aperture therethrough for receiving a fastener for affixing the tube support device to the base structure.

4. A tube support device as in claim 3 wherein the foot portion extends laterally from the lower end of the support leg portion in a direction transverse to the longitudinal axis of the tunnel to facilitate affixing the tube support device to the base structure when a tube is supported by the tube support device.

5. A tube support device as in claim 1 wherein the channel portion has a first end and a second end and a pair of bottom leaf spring portions extending in opposite directions from the first end and the second end toward the longitudinal axis of the tunnel.

6. A tube support device as in claim 5 wherein the pair of bottom leaf spring portions extends from the bottom wall of the channel shaped portion.

7. A tube support device as in claim 1 wherein the cap portion, when in the latched position, has a first end and a second end, and a pair of upper leaf spring portions extending in opposite directions from the first end and the second end angularly toward the longitudinal axis of the tunnel.

8. A tube support device as in claim 1 wherein the at least one first side leaf spring portion extends from an upper portion of the first sidewall toward the bottom wall and the at least one second side leaf spring portion extends from an upper portion of the second sidewall toward the bottom wall.

9. A tube support device as in claim 1 wherein the cap portion is connected to the upper end of the first sidewall by a hinge means, and, when in a closed position, to the upper end of the second sidewall by a latch means.

10. A tube support device as in claim 1 wherein the leaf spring portions are generally triangularly shaped and attached to the channel shaped portion and the cap portion along a base edge of the triangle.

11. A tube support device as in claim 1 which is constructed of injection molded plastic.

12. A tube support device as in claim 9 which is of unitary construction and is formed of injection molded plastic.

13. A tube support device as in claim 12 wherein the leaf spring portions exert a bias force in the range of 1 to 10 kg.

* * * * *